(12) United States Patent
Yokoi

(10) Patent No.: US 7,097,677 B2
(45) Date of Patent: Aug. 29, 2006

(54) POLISHING SLURRY

(75) Inventor: Noriaki Yokoi, Tokyo (JP)

(73) Assignee: Nihon Microcoating Co., Ltd., Tokyo (JP)

( * ) Notice: Subject to any disclaimer, the term of this patent is extended or adjusted under 35 U.S.C. 154(b) by 132 days.

(21) Appl. No.: 10/629,206

(22) Filed: Jul. 29, 2003

(65) Prior Publication Data

US 2004/0020132 A1    Feb. 5, 2004

(51) Int. Cl.
*C09G 1/02* (2006.01)
*C09G 1/04* (2006.01)
*C09K 3/14* (2006.01)

(52) U.S. Cl. .................. 51/298; 51/308; 51/309; 51/307; 106/3

(58) Field of Classification Search ............ 51/298, 51/307, 308, 309; 106/3; 438/692, 693
See application file for complete search history.

(56) References Cited

U.S. PATENT DOCUMENTS 6,582,761 B1 *  6/2003  Nishimoto et al. ......... 427/203

2002/0006728 A1   1/2002  Matsui et al.

FOREIGN PATENT DOCUMENTS

| EP | 1104778 A2 | 6/2001 |
|---|---|---|
| JP | 58-31241 | 3/1983 |
| JP | 2001-152133 | 6/2001 |
| JP | 2001-300843 | 10/2001 |
| JP | 2002-30271 | 1/2002 |
| JP | 2002-80825 | 3/2002 |
| JP | 2002-97456 | 4/2002 |

* cited by examiner

*Primary Examiner*—Michael Marcheschi
(74) *Attorney, Agent, or Firm*—Beyer Weaver & Thomas LLP

(57) ABSTRACT

Polishing slurry has abrading particles dispersed in a liquid dispersant. The abrading particles are composite particles each having a first particle and a plurality of second particles smaller than the first particles attached to the surface of the first particle through a metal oxide membrane. The first particles have average diameter of 0.1–20 μm and the second particles have average diameter of 0.001–0.5 μm. Elastic particles may be used as the first particles such as polymer particles.

1 Claim, 4 Drawing Sheets

POLISHING SLURRY

This application claims priority on PCT patent application PCT/JP02/01486 filed Feb. 20, 2002.

BACKGROUND OF THE INVENTION

This invention relates to polishing slurry to be used for polishing the surface of a metallic as well as non-metallic object.

The surface of a metallic or a non-metallic object is usually polished with free abrading particles. Methods of polishing with free abrading particles are approximately divided into the tape-polishing which uses a polishing tape and the pad-polishing which uses a polishing pad.

The tape-polishing process is carried out by supplying slurry on the surface of the object and running a polishing tape while pressing it on the surface. The pad-polishing process is carried out by rotating a lapping plate with a polishing pad attached to its surface, supplying polishing slurry on the surface of the polishing pad and pressing the surface of the object on it. The polishing tape and the polishing pad used for these methods are produced by cutting a porous sheet of a woven or non-woven cloth or a foamed material into the shape of a tape or a pad. The slurry is obtained by dispersing abrading particles in a dispersant comprising a water-based aqueous solution containing water, glycols or alcohols. Hard particles of a material such as silica, alumina, diamond, cerium oxide, ceramics and glass are used as the abrading particles.

Besides the two polishing technologies mentioned above, a new polishing technology has recently been developed whereby no polishing pad is used and slurry is directly supplied to the surface of a lapping plate. The object is pressed onto the lapping plate and the surface of the object is polished as the lapping plate and the object are moved with respect to each other. According to a published method, micron-sized elastic particles and smaller hard particles are mixed together and a substrate surface is polished during a polishing process by the hard particles which are provisionally attached to the elastic particles. Since no pad is required by this method, the elastic particles each functioning as a pad, this polishing technology is sometimes referred to as the padless polishing. In this method, the hard particles become adhesively attached to the elastic particles electrostatically, by the van der Waales force or by a mechanical force, become separated and again become reattached. This condition of the hard particles separably attached to the elastic particles is sometimes referred to as "virtual attachment."

For polishing an object such as a magnetic hard disk substrate, a semiconductor wafer or a liquid crystal glass substrate which must be prepared to be extremely smooth and flat, polishing slurry with very small abrading particles with average diameter of 0.001–0.5 μm are used in any of these polishing technologies. This is because it is believed that the number of particles per unit surface area that act on the object surface increases if the abrading particles for the slurry are made smaller and hence the object surface can be polished more accurately.

If the size of abrading particles to be mixed to the slurry is reduced, however, the stock removal rate of individual abrading particles becomes smaller and hence it takes longer for the polishing work and the throughput is adversely affected. The current problem, therefore, is that object surfaces cannot be polished quickly and accurately "simply" by reducing the size of the abrading particles in the slurry.

SUMMARY OF THE INVENTION

It is therefore an object of this invention to provide polishing slurry capable of polishing the surface of an object quickly and with a high degree of precision.

This invention relates to polishing slurry with abrading particles dispersed in a liquid dispersant. In view of the object of the invention described above, composite particles each having a first particle and a plurality of second particles smaller than the first particles attached to the surface of the first particle through a metal oxide membrane are used as the abrading particles. The first particles have average diameter of 0.1–20 μm and the second particles have average diameter of 0.001–0.5 μm.

Elastic particles are used as the first particles such as polymer particles of one or more kinds of resins selected from the group consisting of polyurethanes, polyamides, polyolefins, polyimides, polyesters and polyacryls. Spherical silicon particles are preferred.

Hard particles are used as the second particles such as particles of one or more kinds of material selected from the group consisting of silica, alumina, diamond, cerium oxide, ceramics and glass. Silica particles are preferred.

The metal oxide membrane may be formed on the surface of the first or second particles within a solution of a metal oxide obtained by hydrolysis of tetra alkoxy silane with an acid.

The polishing slurry of this invention may further contain third particles which are smaller than the first particles and have average diameter of 0.001–0.5 μm, having both the composite particles and the third particles dispersed in the liquid dispersant. The third particles are hard particles, like the second particles, being of one or more kinds of material selected from the group consisting of silica, alumina, diamond, cerium oxide, ceramics and glass. The size and kinds of the third particles may or may not be the same as those of the second particles. Spherical silica particles may conveniently be used for the purpose.

If polishing slurry of this invention is used to polish an object, the plurality of small second particles attached to the surfaces of the first particles act on the object surface and hence the object surface can be polished at a high stock removal rate, that is, the polishing can be accomplished quickly as well as accurately. If elastic particles are used as the first particles, the individual elastic particles serve as a polishing pad, and since the plurality of small second particles act elastically on the object surface, the object surface can be polished accurately and at a high stock removal rate.

If the third particles are additionally used in the polishing slurry of this invention, they become provisionally attached to the surfaces of the composite particles during the polishing operation. Since such provisionally attached third particles additionally act on the object surface like the second particles, the object surface can be polished accurately and at a high stock removal rate.

DETAILED DESCRIPTION OF THE INVENTION

Figure 1A:
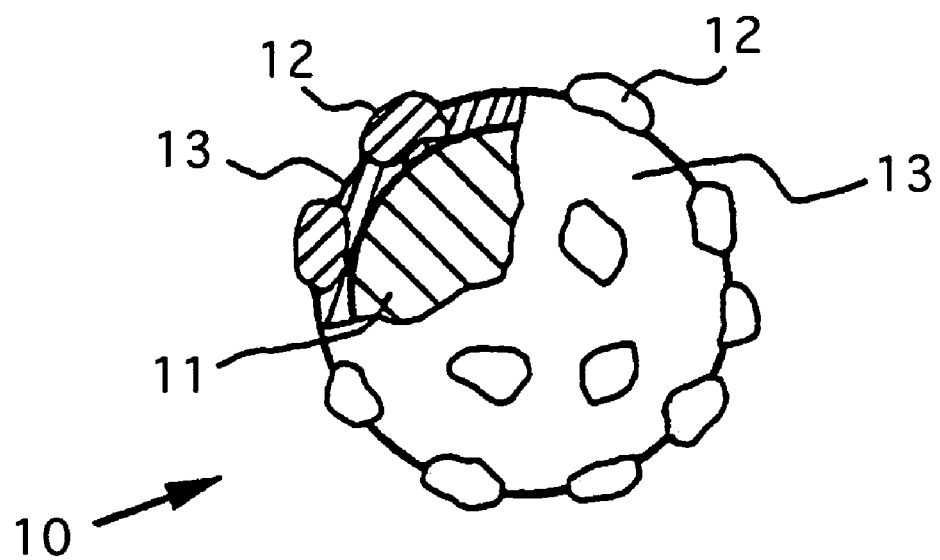
FIGS. 1A and 1B are partially sectional views of abrading particles used in polishing slurry embodying this invention.
Figure 1B:
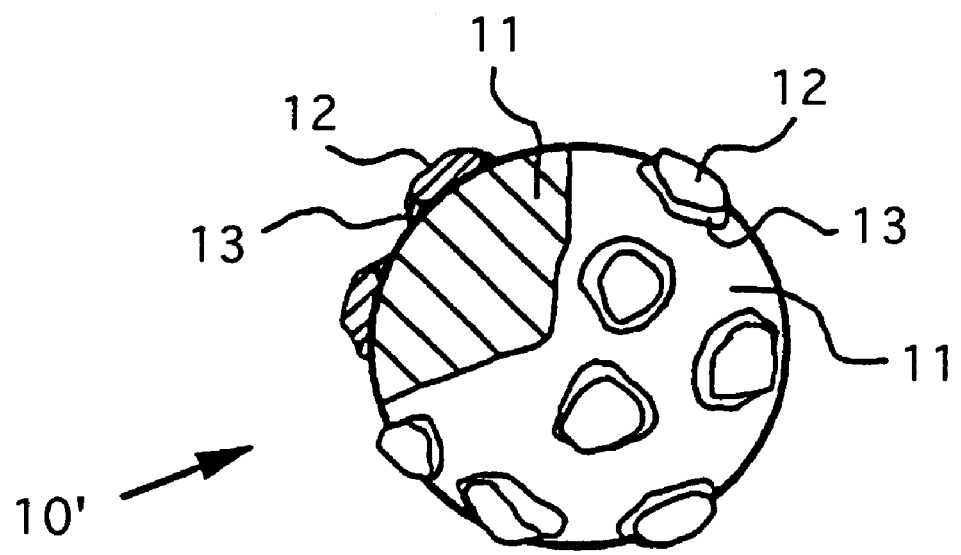

Polishing slurry according to this invention comprises abrading particles and a dispersant which disperses these abrading particles. FIGS. 1A and 1B show composite particles 10 and 10' which may be used as the abrading particles for the slurry of this invention, each having a particle of a first kind (the "first particle") 11 and a plurality of particles of a second kind (the "second particles") 12 smaller than the first particle 11 and attached to the surface of the first particle 11 through a metal oxide membrane 13 which may be formed to cover the entire surface of the first particle 11 as shown in FIG. 1A or may be attached to the individual second particles 12 as shown in FIG. 1B.

The first particle 11 is an elastic particle and is of an average diameter of 0.1–20 μm and strength at 10% compression (in terms of the strength when the diameter of the spherical particle is reduced by 10% as measured by using a tester produced by Shimadzu Seisakusho for measuring the compression strength of very small particles) in the range of 1–50 MPa. One or more kinds of polymer particles selected from the group consisting of polyurethane, polyamide, polyolefin, polyimide, polyester and polyacryl resins are used as elastic particles according to this invention. There is no particular limitation as to their shape but approximately spherical particles having no extreme protrusions or indentations are used. Spherical polymer particles of acryl-styrene, nylon and silicon are preferred. Spherical silicon particles are particularly preferred.

Hard particles with average diameter of 0.001–0.5 μm (substantially harder than the first particles 11) are used as the second particles. One or more kinds of particles of materials such as silica, alumina, diamond, cerium oxide and glass are used as hard particles. Silica particles are preferred. Neither are the second particles particularly limited regarding their shapes but approximately spherical particles not having any extreme protrusions or indentations are used.

These composite particles 10 and 10' are produced as follows. Firstly, the first (or second) particles 11 (or 12) are dispersed in a metal oxide solution (sol). Secondly, an aqueous solution having the second (or first) particles 12 (or 11) dispersed therein is added thereto to thereby form a membrane of the metal oxide (gel membrane) on the surfaces of the first (or second) particles 11 (or 12) and to attach a plurality of the second particles 12 on the surface of each first particle 11. Thirdly, the composite particles thus obtained are filtered, washed and dried. They may be subjected further to a burning process in order to affix the second particles 12 more strongly to the first particles 11 through the metal oxide (gel) membrane 13.

Such a method of forming a gel membrane on the surface of particles dispersed inside a sol and attaching other particles thereto through this gel membrane is referred to as the sol-gel method. The attachment of the second particles 12 to the surfaces of the first particles 11 by the sol-gel method can be improved by introducing functional groups such as —COOH and —OH.

Examples of metal oxide solution used for the production of the composite particles 10 and 10' include those obtained by hydrolysis of tetra-alkoxy silane such as tetramethoxy silane, tetraethoxy silane, tetrapropoxy silane and tetrabutoxy silane with an acid. Silicon tetrachloride may be hydrolyzed with an acid and an aqueous solution of sodium silicate may also be used. If silicon tetrachloride is hydrolyzed with an acid, however, hydrogen chloride gas is generated. If a sodium silicate solution is used, on the other hand, the sol becomes unstable and tends to turn into a gel because it is strongly alkaline and hence it must be handled under a condition below the freezing point. This is why the aforementioned methods of hydrolysis of tetra-alkoxy silane with acid are preferred.

Silicon particles and silica particles are preferably used as the first and second particles 11 and 12, respectively. In this case, composite particles of silicon particles each having a plurality of silica particles attached to the surface through a metal oxide membrane can be produced by generating silicon particles by adding an alkali to an aqueous solution of methyl trioxy silane for hydrolysis (as disclosed, for example, in Japanese Patent Publication Tokkai 6-248081) and mixing them with a metal oxide solution (sol) having silica particles dispersed therein.

Dispersing the aforementioned composite particles 10 and 10' in a liquid dispersant produces polishing slurry according to this invention. This dispersant is water or a water-based aqueous solution containing glycols or alcohols. The dispersant may additionally contain an additive adapted to chemically react with the surface of the object on which chemical mechanical polishing (CMP) is intended to be effected. Different kinds of additives may be selected, depending on the material that forms the surface of the object to be polished. If the object surface is $SiO_2$, for example, potassium hydroxide, tetramethyl ammonium hydroxide, fluoric acid and fluorides may be used. If the object surface is tungsten, iron nitrate and potassium iodate may be used. If the object surface is Cu, use may be made of glycine, quinaldinic acid, hydrogen peroxide and benzotriazole.

The slurry according to this invention may contain not only the aforementioned composite particles 10 and 10' but also particles of a third kind (or the "third particles") smaller than the first particles such that the composite particles 10 and 10' and the third particles are dispersed in a liquid dispersant.

The third particles, like the second particles, are hard particles with average diameter of 0.001–0.5 μm. One of more kinds of particles of materials such as silica, alumina, diamond, cerium oxide, ceramics and glass are used as the hard particles. There is no particular limitation on their shapes but approximately spherical particles with no extreme protrusions or indentations are used. The size and kind of the third particles may be the same as or different from those of the second particles.

A method of using slurry embodying this invention to polish the surface of a base plate such as a magnetic hard disk substrate and a semiconductor wafer will be described next.

Figure 2:
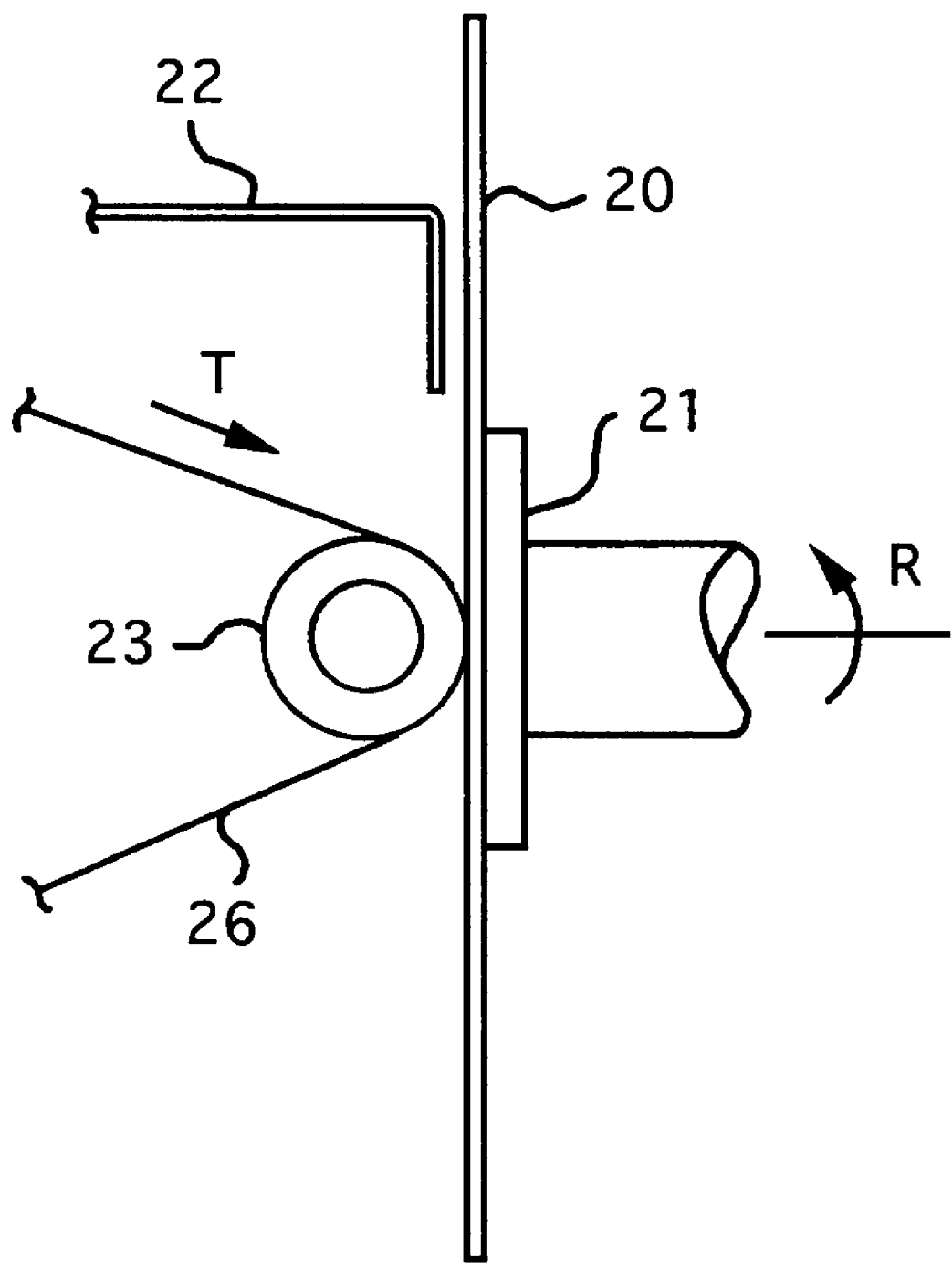
FIG. 2 is a schematic drawing for showing the structure of a polishing device for the tape-polishing.

For a tape-polishing method as shown in FIG. 2, a chuck 21 having a base plate 20 attached is rotated in the direction of arrow R and polishing slurry of this invention is supplied to the surface of the base plate 20 through a nozzle 22. A contact roller 23 serves to push a polishing tape 26 against the surface of the base plate 20 while being rotated in the direction of arrow T. A porous tape of a woven or non-woven cloth may be used as the polishing tape 26. A tape having a polishing layer with abrading particles attached by means of a resin binder may also be used as the polishing tape 26.

Figure 3:
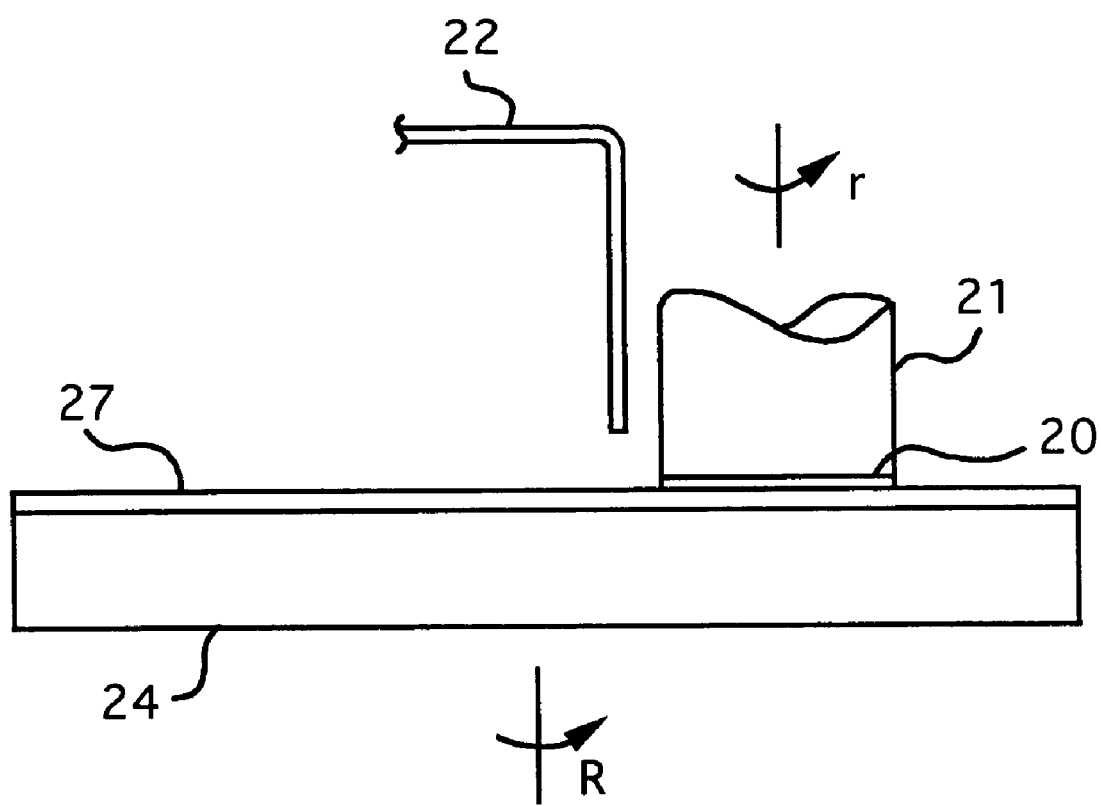
FIG. 3 is a schematic drawing for showing the structure of a polishing device for the pad-polishing.

For a pad-polishing method as shown in FIG. 3, a lapping plate 24 having a polishing pad 27 attached to its surface is rotated and polishing slurry of this invention is supplied to the surface of the polishing pad 27 through a nozzle 22 as the base plate 20 supported by a chuck 21 is pressed against it as it is rotated in the direction of arrow r. A porous pad of a woven or non-woven cloth or a foamed material may be used as the polishing pad 27. A pad having a polishing layer with abrading particles applied by means of a resin binder may also be used as the polishing pad.

Figure 4A:
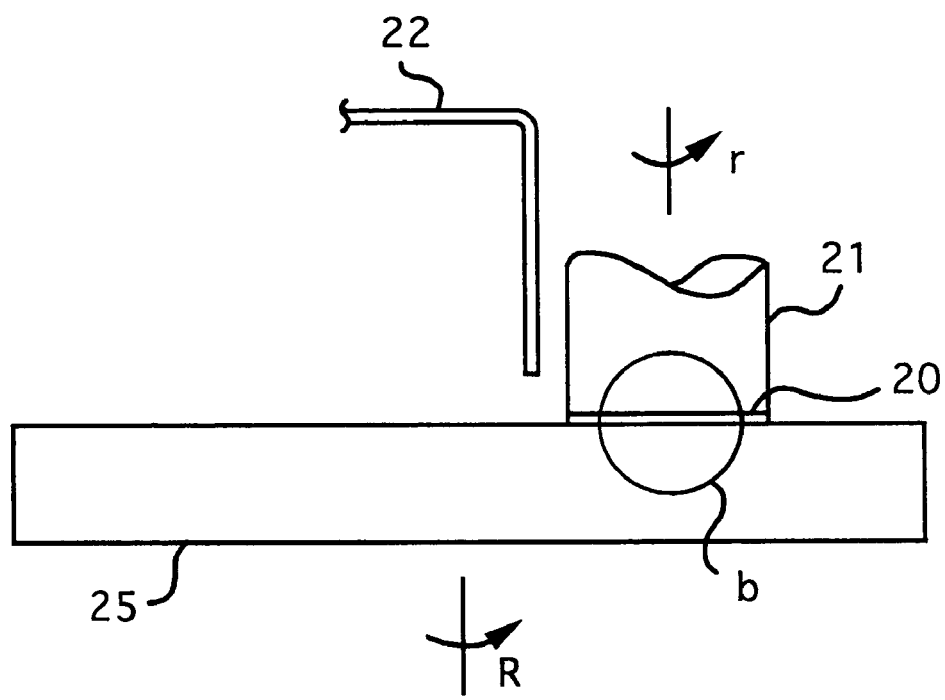
FIG. 4A is a schematic drawing for showing the structure of a polishing device for the padless polishing and FIG. 4B is an enlarged drawing of a portion of FIG. 4A indicated by letter b.
Figure 4B:
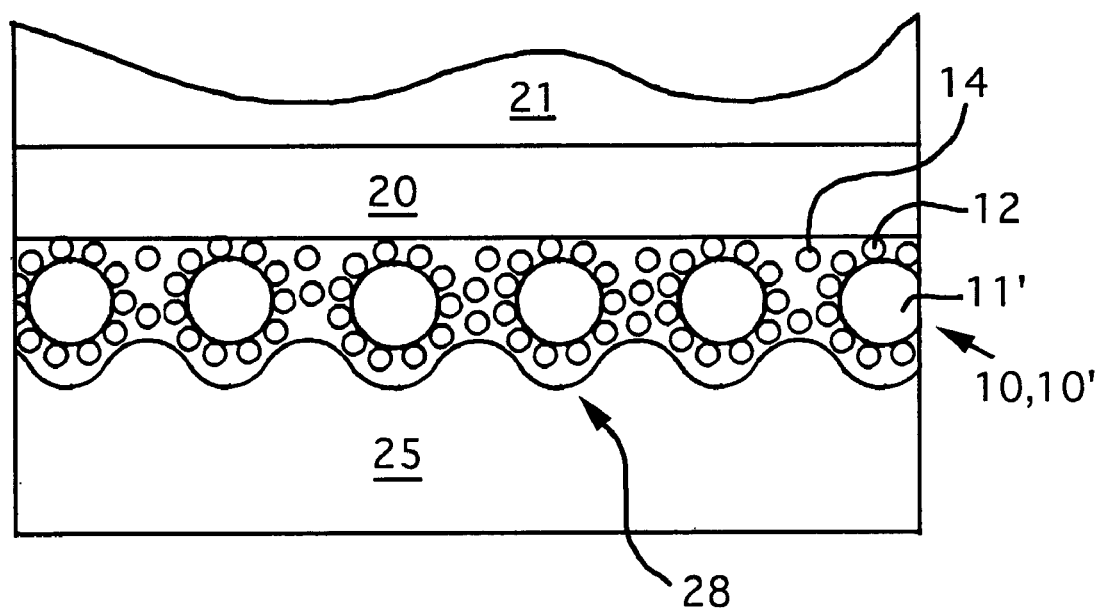

For a padless polishing method as shown in FIGS. 4A and 4B, elastic particles 11' are used as the first particles 11 of the composite particles 10 and 10' of polishing slurry. A lapping plate 25 with indentations 28 for holding the composite particles 10 and 10' on its surface is rotated in the direction of arrow R and polishing slurry of this invention is supplied to the surface of this lapping plate 25 through a nozzle 22 as the base plate 20 supported by a chuck 21 is pressed against it as it is rotated in the direction of arrow r. The elastic particles 11' of the individual composite particles 10 and 10' function as an elastic polishing pad. In the example shown in FIG. 4B, the polishing slurry further contains the third particles 14. These third particles 14, provisionally attached to the surfaces of the composite particles 10 and 10' (in the aforementioned condition of virtual attachment) during the polishing process, operate elastically on the surface of the base plate 20.

The invention is described next in terms of a test example.

Methyl trimethoxy silane 198 g was added to ion exchange water 600 g with pH 5.0–5.5 heated to 60° C. and after it was stirred for 30 minutes at 200 rpm, 0.1N aqueous solution of NaOH 4.0 ml was added. After it was stirred for 5 minutes, it was left for 30 minutes to cause turbid whiteness and sedimentation from which silicon particles with average diameter 5.4 μm and strength of 10.5 MPa at 10% compression to serve as the first particles were generated and a liquid with dispersed silicon particles was prepared.

Tetramethoxy silane 9.9 g was added to ion exchange water 10 g with pH 4.0 heated to 60° C. and after hydrolysis with stirring at 200 rpm, polishing slurry 40 g having silica particles 1.2 g with average diameter 30 nm dispersed in water was added. The mixture was stirred for 5 minutes to prepare a liquid dispersion of silica particles and it was then left stationary for 30 minutes.

Next, this liquid with dispersion of silica particles was added to the dispersion of silicon particles. After the mixture was stirred for 1 hour at 60° C. with stirring at 200 rpm, it was made neutral, suction-filtered, washed with water, washed with ethanol, dried by means of an evaporator and then subjected to a burning process at 300° C. for 2 hours to obtain white powder.

This white powder was the composite particles to be used for polishing slurry and their average diameter was 5.3 μm. This is smaller than the average diameter of the silicon particles before they were made into the composite particles because of the burning process at 300° C. If the burning process is at a higher temperature, say, at 500° C., the reduction in the size of the silicon particles becomes more significant.

The composite particles used in the polishing slurry for this example are of the type shown at 10' in FIG. 1B, having a plurality of silica particles on the surface of each silicon particle through gel membranes that are each formed on the surface of each silica particle.

The polishing slurry for this example was produced by adding 3 weight % of the composite particles described above and 5 weight % of silica particles with average diameter 0.03 μm into 92 weight % of pure water and stirring the mixture.

As polishing tests (Tests 1 and 2 to be described below), the polishing slurry thus produced was used to polish the surface of a 4-inch silicon wafer and the surface roughness (Ra), the degree of winding (Wa) and the presence or absence of scratches were examined.

Test 1

A polishing machine as shown in FIG. 4A was used to carry out the padless polishing. The lapping plate 25 was a product obtained by projecting molten tungsten carbide on a stainless steel circular disk of diameter 380 mmø and polishing its entire surface by sand blasting in an arbitrary direction. The surface roughness of the lapping plate 25 was 3.0 μm.

The polishing was carried out under the conditions shown in Table 1 and the results of the test are shown in Table 2.

TABLE 1

| | |
|---|---|
| Pressure on the lapping plate | 300 gf/cm$^2$ |
| Rotary speed of the lapping plate | 60 rpm |
| Rotary speed of the chuck | 60 rpm |
| Slurry supply rate | 20 cc/minute |
| Time of polishing | 20 minutes |

Test 2

A pad polishing method was used by means of a polishing machine as shown in FIG. 3. A polishing pad made of a foamed material (product name SUBA400 manufactured by RODEL Co., Ltd.) was adhesively attached to the surface of a lapping plate of diameter 380 mmø. The polishing was carried out under the same conditions as shown in Table 1. The results of the test are also shown in Table 2.

TABLE 2

| | Surface roughness (Ra) | Winding (Wa) | Scratches |
|---|---|---|---|
| Test 1 | 9 Å | 13 Å | Absent |
| Test 2 | 7 Å | 19 Å | Absent |

Table 2 clearly shows that a silicon wafer can have its surface mirror-polished without generating scratches.

What is claimed is:

1. Polishing slurry comprising:
   abrading composite particles each having a first particle and a plurality of second particles smaller than said first particles attached to surface of said first particle through a metal oxide membrane;
   third particles which are smaller than said first particles; and a liquid dispersant dispersing said composite particles and said third particles;
   wherein the first particles are silicon particles and have average diameter of 0.1–20 μm, wherein the second particles are silica particles and have average diameter of 0.001–0.5 μm, and wherein the third particles have average diameter of 0.001–0.5 μm.

* * * * *

UNITED STATES PATENT AND TRADEMARK OFFICE
CERTIFICATE OF CORRECTION

| | | |
|---|---|---|
| PATENT NO. | : 7,097,677 B2 | Page 1 of 1 |
| APPLICATION NO. | : 10/629206 | |
| DATED | : August 29, 2006 | |
| INVENTOR(S) | : Noriaki Yokoi | |

It is certified that error appears in the above-identified patent and that said Letters Patent is hereby corrected as shown below:

On Title Page,

Add section:

Item --(30)    Related Foreign Application Data
            This file is a Continuation of PCT/JP02/01486, filed Feb. 20, 2002.--

Signed and Sealed this

Twenty-eighth Day of November, 2006

JON W. DUDAS
*Director of the United States Patent and Trademark Office*